United States Patent [19]

Nagano

[11] Patent Number: 4,678,946
[45] Date of Patent: Jul. 7, 1987

[54] CIRCUIT IN WHICH OUTPUT CIRCUIT AND OPERATIONAL AMPLIFIER EQUIPPED INPUT CIRCUIT ARE ELECTRICALLY ISOLATED

[75] Inventor: Katsumi Nagano, Shimonoseki, Japan

[73] Assignee: Kabushiki Kaisha Toshiba, Japan

[21] Appl. No.: 874,092

[22] Filed: Jun. 13, 1986

Related U.S. Application Data

[62] Division of Ser. No. 668,832, Nov. 6, 1984, Pat. No. 4,636,655.

[30] Foreign Application Priority Data

Nov. 11, 1983 [JP] Japan ................................. 58-211876
Dec. 27, 1983 [JP] Japan ................................. 58-246342

[51] Int. Cl.$^4$ .......................... G06G 7/12; H03K 3/42
[52] U.S. Cl. ..................................... 307/490; 307/311;
328/142; 250/551; 330/59
[58] Field of Search .................... 307/311, 490; 328/2,
328/26, 142, 143; 330/59; 250/211, 551

[56] References Cited

U.S. PATENT DOCUMENTS

| | | | |
|---|---|---|---|
| 3,112,449 | 11/1963 | Miller | 328/26 |
| 3,196,291 | 7/1965 | Woodward, Jr. | 307/503 |
| 3,410,961 | 11/1968 | Slana | 307/311 |
| 3,588,671 | 6/1971 | Deboo et al. | 307/261 |
| 3,736,515 | 5/1973 | Kadron et al. | 307/490 |
| 3,893,037 | 7/1975 | Herbert | 330/59 |
| 4,066,973 | 1/1978 | McNally | 330/59 |
| 4,268,789 | 5/1981 | Nagano | 323/315 |
| 4,424,458 | 1/1984 | Buck et al. | 307/311 |

FOREIGN PATENT DOCUMENTS

| | | |
|---|---|---|
| 0050417 | 4/1982 | European Pat. Off. . |
| 2603634 | 8/1977 | Fed. Rep. of Germany . |
| 2801896 | 7/1978 | Fed. Rep. of Germany . |
| 1376961 | 12/1974 | United Kingdom . |

OTHER PUBLICATIONS

Wittlinger, "Absolute Value Circuit", pulbished in RCA Technical Notes, TN No. 960, on Jun. 17, 1974, in the United States.

Primary Examiner—Stanley D. Miller
Assistant Examiner—B. P. Davis
Attorney, Agent, or Firm—Finnegan, Henderson, Farabow, Garrett & Dunner

[57] ABSTRACT

A function generator which has a plurality of operational amplifiers and a reference voltage generator circuit for applying a different reference voltage to the input terminal of each of the plurality of operational amplifiers. Also included is an LED connected between the output terminal and input terminal of each of the operational amplifiers; photo transistors which receive the emitted light of the LEDs for conversion into a current; and a load resistor which converts the current to a voltage.

6 Claims, 20 Drawing Figures

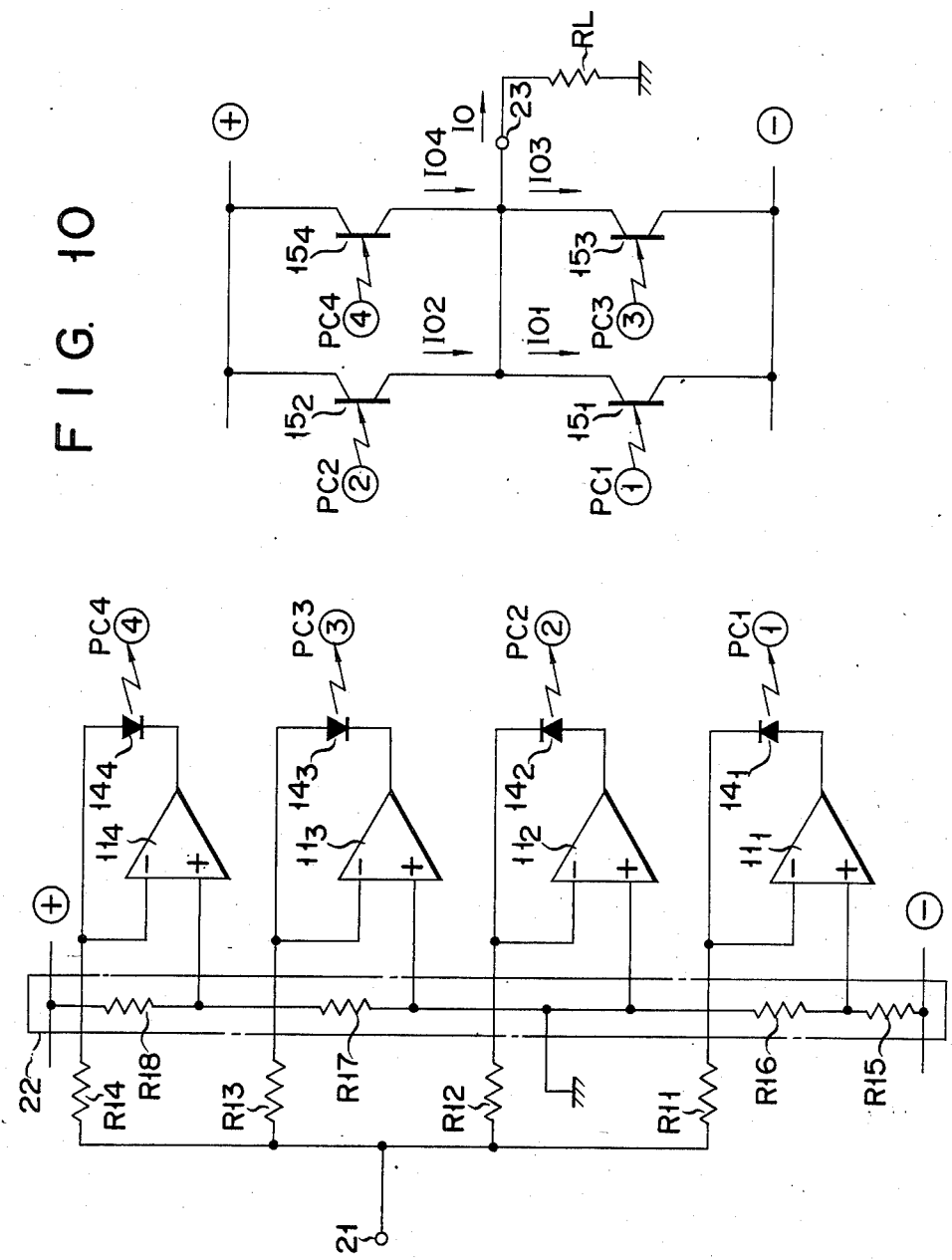

CIRCUIT IN WHICH OUTPUT CIRCUIT AND OPERATIONAL AMPLIFIER EQUIPPED INPUT CIRCUIT ARE ELECTRICALLY ISOLATED

This is a division of application Ser. No. 06/668,832, filed Nov. 6, 1984, now U.S. Pat. No. 4,636,655.

BACKGROUND OF THE INVENTION

This invention relates to a circuit in which the output circuit and the input circuit, which includes an operational amplifier, are electrically isolated.

Many different kinds of full wave rectifying circuits are known. However, in all of these there was a circuit design limitation in the range of the level variation between the output and input voltages. Accordingly, the applicability of these circuits was circumscribed.

In order to solve this problem, a full wave rectifying circuit, which electrically isolates the input and output using a dual polarity photocoupler, has be proposed. However, in this kind of circuit, there is a decrease in the output voltage due to the forward voltage Vf of the light-emitting diode, which becomes the source of output error.

Also function generators are known, which produce function curves, such as a voltage-current characteristic curve. In general, function generators are constructed of a plurality of limiter circuits. However, in the various prior art function generators the input and output circuits were electrically connected so that they had to be operated at the same voltage. This results in a complicated circuit structure.

SUMMARY OF THE INVENTION

An object of this invention, in consideration of the above facts, is to provide a full wave rectifying circuit which has a wide range of applications and can produce an accurate output.

Another object of this invention is to provide a function generator which can drive different input/output circuit systems with different voltage sources, thereby simplifying circuit design.

According to the invention, there is provided a full wave rectifying circuit comprising: an operational amplifier to one input terminal of which a reference voltage is applied and to the other input terminal of which an AC input voltage is applied; first and second electrophoto converting elements of mutually opposite polarity inserted in parallel in the feedback loop between the output terminal and said other input terminal of said amplifier; first and second photoelectric converting elements optically coupled with said electrophoto converting elements and mutually connected in parallel; and a load element which changes the output current of said photoelectric converting elements to voltage.

According to the invention, there is further provided a function generator comprising: a plurality of operational amplifiers; a reference voltage generating circuit for applying a different reference voltage to an input terminal of each of said plurality of amplifiers; a resistor connected between the other input terminal of each of said plurality of operational amplifiers and the input terminal to which an input voltage is applied; an electrophoto converting element connected between an output terminal of said plurality of amplifiers and said other input terminal; a plurality of photoelectric converting elements, which are optically coupled with said electrophoto converting elements and which operate when the corresponding electrophoto converting elements operate thereby forming a current path between the power source and the circuit output terminal; and a load element for converting the output current of said plurality of photoelectric converting elements into voltage.

BRIEF DESCRIPTION OF THE DRAWINGS

FIG. 10 is a circuit diagram of a function generator of another embodiment of the invention;

DETAILED DESCRIPTION OF THE PREFERRED EMBODIMENTS

The following is a description of the embodiments of the invention taken in conjunction with the drawings.

Figure 1:
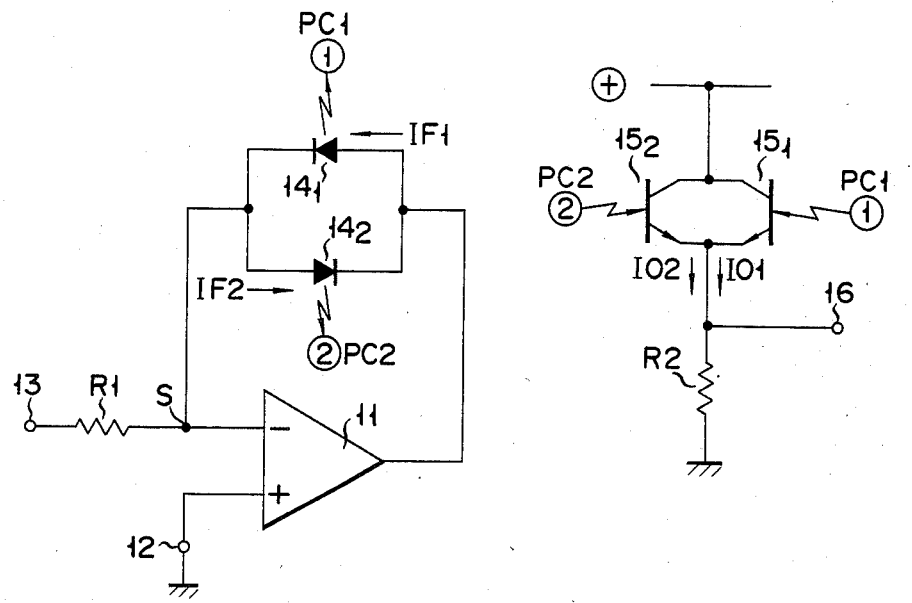
FIG. 1 shows a full wave rectifying circuit of the first embodiment of the invention.

In the full wave rectifying circuit of FIG. 1, reference numeral 11 denotes an operational amplifier (op amp) the noninverting input terminal (+) of which is connected to a reference voltage such as terminal 12, which is connected to ground GND, and the inverting input terminal (−) is connected to circuit input terminal 13, to which is applied the AC input voltage Vin, via resistor R1. A feedback loop is provided between the output terminal and the inverting input terminal (−) of op amp 11. This feedback loop includes opposite-polarity, parallel-connected first and second photoconverting elements $14_1$ and $14_2$, such as light emitting diodes (LED). This structure constitutes the input circuit.

The output circuit, on the other hand, includes same-polarity, parallel-connected first and second photoconverting elements such as photo transistors $15_1$ and $15_2$, which are optically connected to LEDs $14_1$ and $14_2$. The collectors of photo transistors $15_1$ and $15_2$ are connected to a common positive (+) power source line, and the emitters are connected to a common ground GND via load resistor R2. Circuit output 16 is connected to the emitters. Photocoupler $PC_1$ is constructed of LED $14_1$ and transistor $15_1$ and photocoupler $PC_2$ is constructed LED $14_2$ and transistor $15_2$.

The following is a description of the operation of the above rectifying circuit. As is well known, the potential difference between the inverting (−) and noninverting (+) input terminals of an op amp is zero. Accordingly, with the circuit connection shown in FIG. 1, the potential of the inverting input terminal (−) is equal to the ground potential Vref.

When the AC input voltage Vin is positive, the potential of the output terminal of amp 11 is negative (in this case, the node S between resistor R1 and inverting input terminal (−) is at ground potential) so a forward bias voltage is applied to LED $14_2$ and a reverse bias voltage is applied to LED $14_1$. Accordingly, LED $14_2$ lights up. At this time, the voltage at both ends of resistor R1 is equal to the input voltage Vin so a current IF2 with a value of the input voltage Vin divided by resistance R1 flows in LED $14_2$. The light signal produced by LED $14_2$ is received by photo transistor $15_2$ and an emitter current $I_{02}$ corresponding to this signal flows in photo transistor $15_2$. Namely, the light signal is converted to an emitter current $I_{02}$ having a corresponding size by photo transistor $15_2$. The emitter current $I_{02}$ of photo transistor $15_2$ flows to ground via resistor R2 and is converted to the voltage signal. Then the output Vout is extracted from the output terminal 16.

On the other hand, when the input voltage Vin is negative, the potential of the output terminal of amp 11 is positive (in this case, the node S is at ground potential) so a forward bias voltage is applied to LED $14_1$ and a reverse bias voltage is applied to LED $14_2$. Accordingly, LED $14_1$ lights up. At this time, the voltage at both ends of resistor R1 is equal to the input voltage Vin so a current IF1 with a value of the input voltage Vin divided by resistance R1 flows in LED $14_1$. The light signal produced by LED $14_1$ is received by photo transistor $15_1$, and an emitter current $I_{01}$ corresponding to this signal flows in photo transistor $15_1$. Namely, the light signal is converted to an emitter current $I_{01}$ having a corresponding size by photo transistor $15_1$. The emitter current $I_{01}$ of photo transistor $15_1$ is converted to the voltage signal by resistor R2 and is converted to the voltage signal, and the output Vout is extracted from the output terminal 16.

The above operation is shown by the following mathematical equations in which Vos is the input offset voltage and K1, K2 are the conversion ratios of photocouplers PC1, PC2.

When Vin>0

$$IF2=(Vin-Vos)/R1 \quad (1)$$

$$I02=K2 \cdot IF2 \quad (2)$$

$$Vout=K2(Vin-Vos)R2/R1 \quad (3)$$

When Vin<0

$$IF1=(Vin-Vos)/R1 \quad (4)$$

$$I01=-K1 \cdot IF1 \quad (5)$$

$$Vout=-K1(Vin-Vos)R2/R1 \quad (6)$$

As is clear from equations (3) and (6), the output voltage Vout is not affected by the forward voltage drop VF of the LED, and only the input offset voltage Vos of amp 11 affects the conversion of the input voltage Vin to the output voltage Vout. This input offset voltage is normally in the negligible range of several mV. Also, because the input circuits are electrically isolated by photocouplers PC1, PC2, it is possible to operate the input circuits with different power sources and, consequently, the range of applications for the device is increased.

Figure 2:
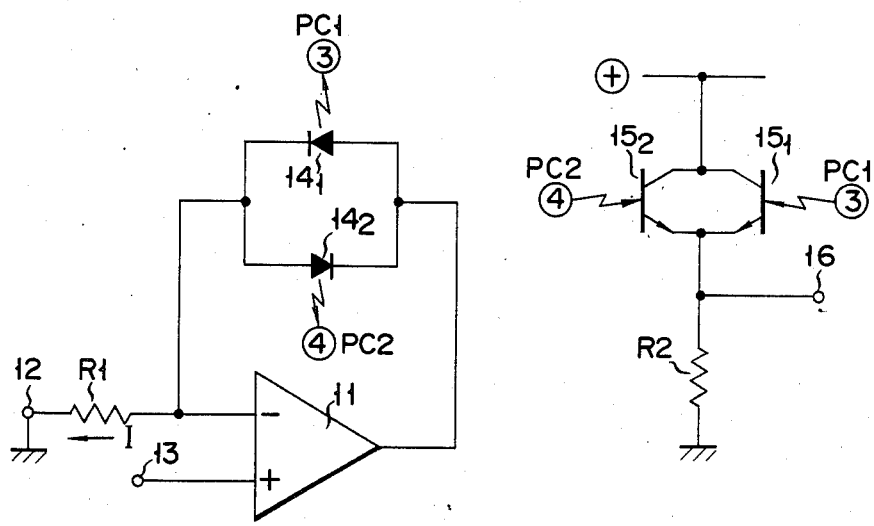
FIG. 2 shows a full wave rectifying circuit of the second embodiment of the invention.

FIG. 2 shows a full wave rectifying circuit according to another embodiment of this invention. In the embodiment of FIG. 1, amp 11 was used as an inverting amplifier, whereas in this embodiment it is used as a noninverting amplifier. Aside from this point, the electrical structure is the same as that shown in FIG. 1 so the same reference numerals have been used to denote the same parts, and description of which has been omitted.

Namely, in the embodiment of FIG. 2, the noninverting input terminal (+) of amp 11 is connected to the circuit input terminal 13, and the inverting input terminal (−) is connected to ground via resistor R1. The current shown in the following equation (7) flows in resistor R1.

$$I=(Vin-Vos)/R1 \quad (7)$$

The difference between the operation of a rectifying circuit having a structure such as that described above and that of the embodiment of FIG. 1 lies only in that when the input voltage Vin is positive or negative, the corresponding LEDs that emit light are different. Namely, in the rectifying circuit shown in FIG. 2, when the input voltage Vin is positive, LED $14_1$ lights up and photocoupler PC1 operates. Also, when the input voltage Vin is negative, LED $14_2$ lights up and photocoupler PC2 operates. The other operations are the same as in the embodiment of FIG. 1. The electrical effect of this embodiment is also the same.

Figure 3:
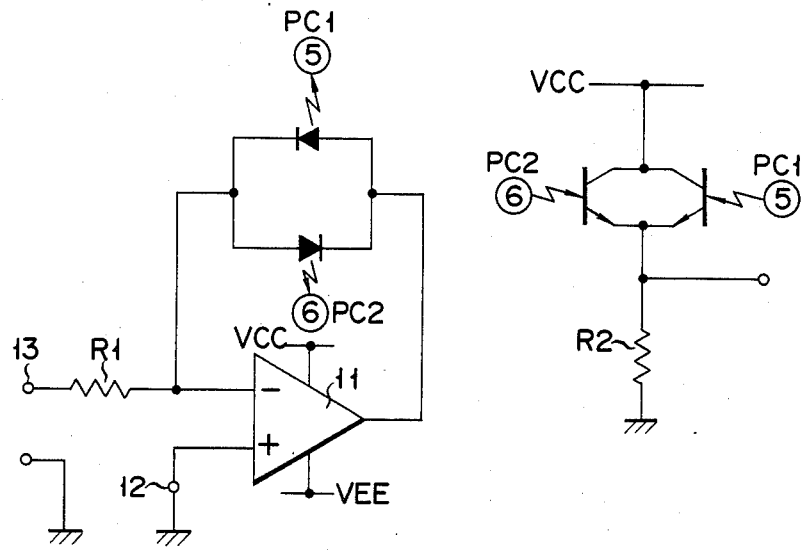
FIG. 3 shows a test circuit used to investigate the characteristics of the full wave rectifying circuit of the invention.

In order to confirm the operation of the full wave rectifier circuit shown in FIG. 1, a test circuit such as that shown in FIG. 3 was constructed and the output characteristics were measured. For op amp 11, TA7504P, manufactured by Toshiba and for photocouplers PC1, PC2, TLP521, also by Toshiba were used. The power source VCC was 15 V, VEE was −15 V, and the resistance of R1 and R2 was 10 kΩ.

Figure 4:
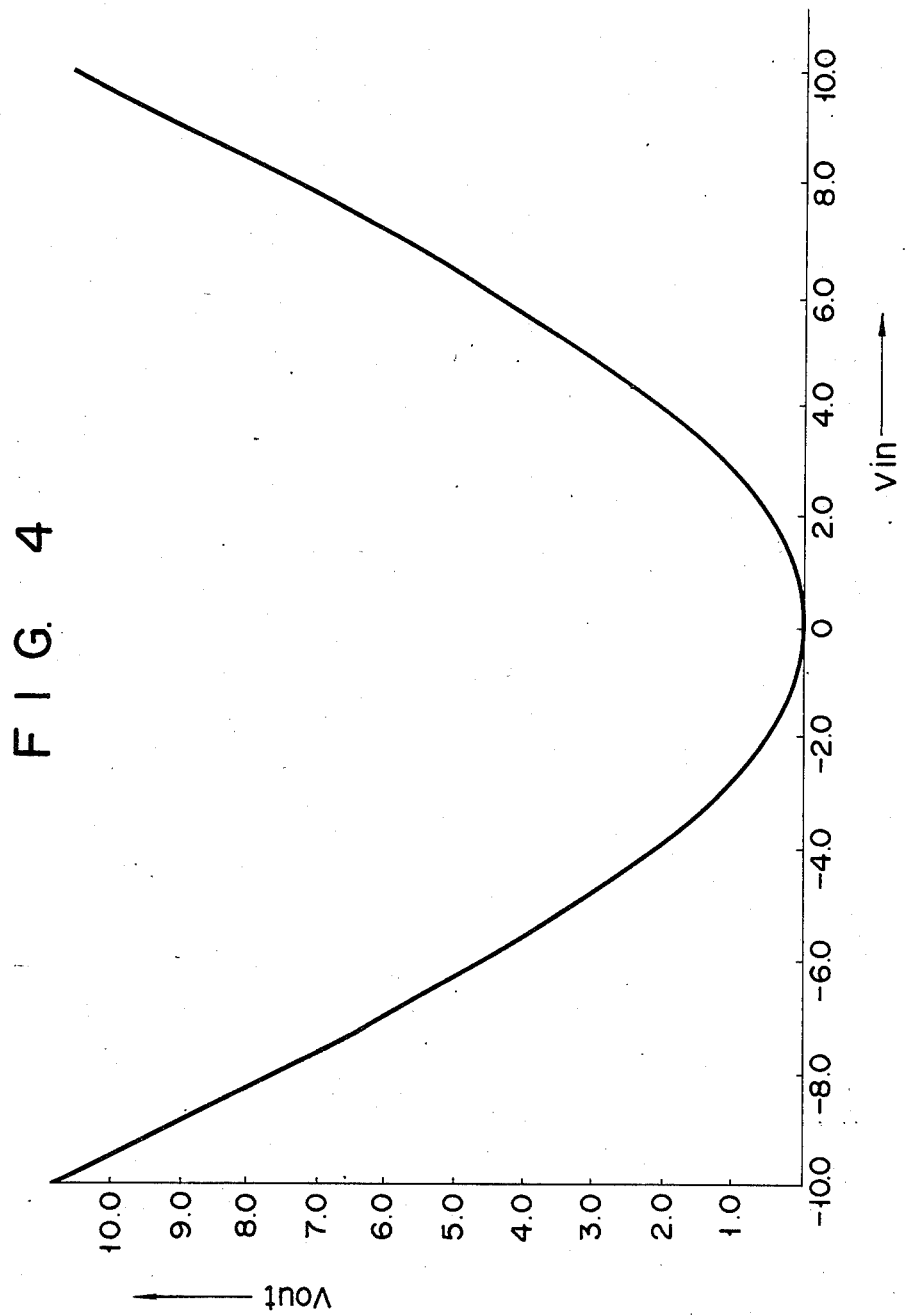
FIG. 4 shows the input/output voltage characteristics of the circuit shown in FIG. 3.

The result of the experiment, is shown by the Vin-Vout characteristic curve in FIG. 4 when the input voltage Vin was varied from −10 V to +10 V. This curve is close to the absolute function of input voltage Vin. Input voltage Vin loses its linearity when it approaches 0 V. This means that the conversion efficiency of the photocoupler displays linearity in a large current region and square root characteristics in the small current region.

Figure 5:
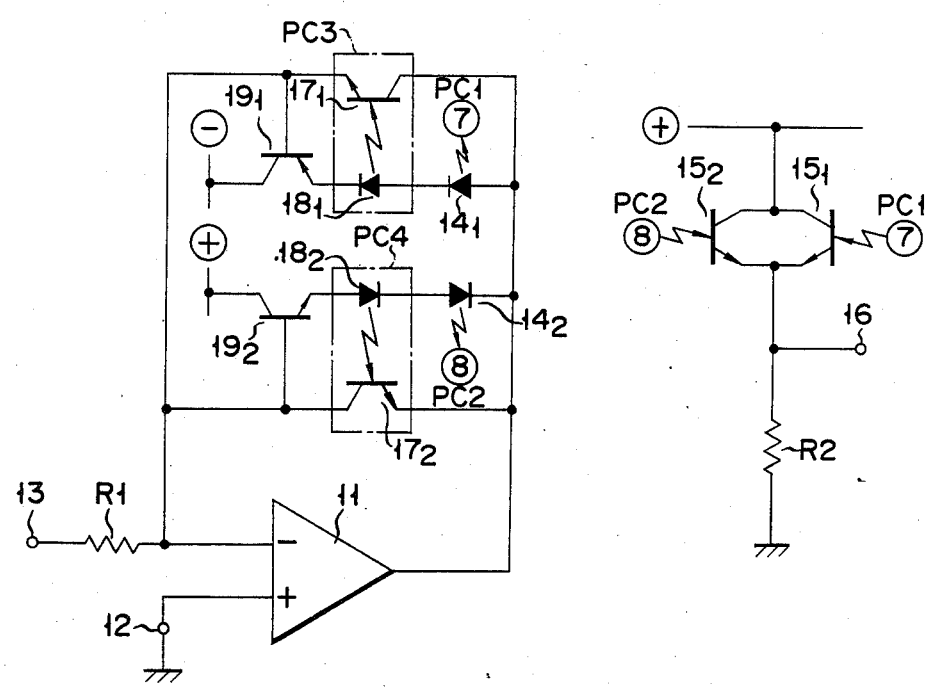
FIG. 5 shows a full wave rectifying circuit of another embodiment of the invention.

FIG. 5 shows a full wave rectifying circuit of another embodiment of this invention which can compensate the characteristics of these photocouplers in the small current region. In the drawing, the same reference numerals have been used for the same parts and description of which has been omitted. The collector-emitter path of photo transistor $17_1$ of photocoupler PC3 and the emitter-collector path of photo transistor $17_2$ of photocoupler PC4 are connected in parallel between the output terminal and inverting input terminal of op amp 11. Also, a negative power source line (−) is connected to the output terminal of op amp 11 via the anode-cathode path of LED $14_1$ of photocoupler PC1, the anode-cathode path of LED $18_1$ of photocoupler PC3, and the emitter-collector path of transistor $19_1$, which is connected to the emitter of photo transistor 17$_1$.

In the construction shown in FIG. 5, photocouplers PC1 and PC3 and photocouplers PC2 and PC4 form pairs and compensate the square root characteristic in the small current regions. Namely, when the AC input voltage Vin is positive, the output of the op amp 11 becomes negative potential so a base current from input terminal 13 is supplied to transistor 19$_2$ via resistor R1. Then, when transistor 19$_2$ is turned ON (transistor 19$_1$ is OFF at this time), a forward bias current flows in the LEDs 18$_2$, 14$_2$ which then emit light. The light from LED 18$_2$ is received by photo transistor 17$_2$ and a current corresponding to the light signal from LED 18$_2$ flows in the collector-emitter path of photo transistor 17$_2$. With this, the base current of the transistor 19$_2$ is divided, the conductive resistance is varied and the current supplied to the LEDs 18$_2$ and 14$_2$ is varied. If the characteristics of the photocouplers PC2 and PC4 are the same, the current corresponding to the square root characteristic in the small current region of LED 14$_2$ is divided as the collector-emitter path current of photo transistor 17$_2$ so it can be compensated. Namely, a forward bias current of LED 18$_2$ flows in photo transistor 17$_2$ such that a current which is equal to the input current (Iin=Vin/R1) flows. The same forward bias current that flows in LED 18$_2$ also flows in LED 14$_2$ so the current in the collector-emitter path of photo transistor 15$_2$ comes closer to the input current Iin. With this operation the square root characteristic of the photo transistor is compensated.

On the other hand, when the AC input current Vin is negative, transistor 19$_1$ turns ON (transistor 19$_2$ is OFF). At this time, the output of op amp 11 has a positive potential so a current flows in the negative power source line (−) via LEDs 14$_1$, 18$_1$ and transistor 19$_1$ from the output terminal of op amp 11 and LEDs 14$_1$, 18$_1$ emit light. Photo transistor 17$_1$ receives the light and a current corresponding to the light signal of LED 18$_1$ flows in the collector-emitter path of photo transistor 17$_1$. This then causes the current supplied to LEDs 14$_1$, 18$_1$ from op amp 11 to be divided. If the characteristics of photocoupler PC1, PC3 are the same, the current corresponding to the square root characteristic in the small current region of LED 14$_1$ is divided as the collector-emitter path of photo transistor 17 and this is compensated.

Namely, a forward current flows in LED 18$_1$ such that a current which is equal to the input current (Iin=-Vin/R1) flows in photo transistor 17$_1$. As the same forward current flows across LED 18$_1$ as across LED 14$_1$, the current in the collector-emitter path of photo transistor 15$_1$ approaches the input current Iin. With this operation the square root characteristic is compensated.

The above was a description of a circuit in which the op amp 11 is used as an inverted amplifier and is given a square root compensation function. It is, however, possible to directly supply an AC input voltage Vin to the noninverting input terminal (+) of op amp 11 and to connect the inverting terminal (−) to ground GND via resistor R1 to thereby turn op amp 11 into a noninverting amplifier (see FIG. 2), in which case, as well, the square root characteristic of photocouplers PC$_1$ and PC$_2$ is compensated.

Figure 6A:
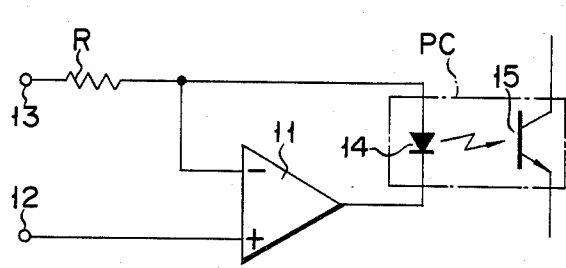
FIGS. 6A, 7A, 8A and 9A are the circuit diagrams of the limiter circuits which comprise the function generator of another embodiment of the invention.
Figure 6B:
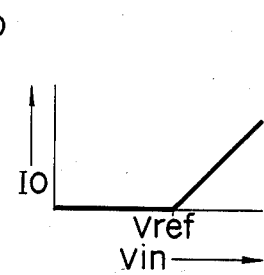
FIGS. 6B, 7B, 8B and 9B show the input voltage-output current characteristics of the above limiter circuits.
Figure 7A:
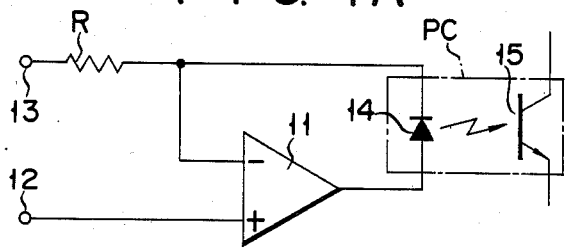
Figure 7B:
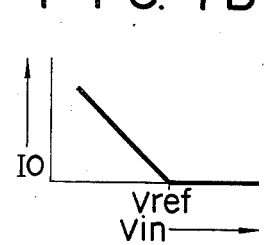
Figure 8A:
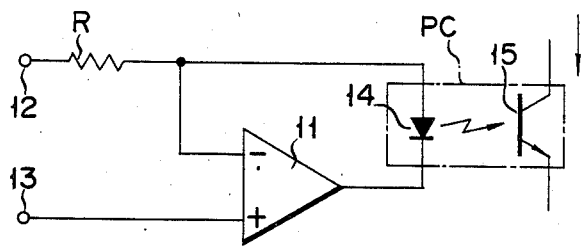
Figure 8B:
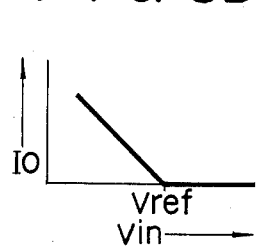
Figure 9A:
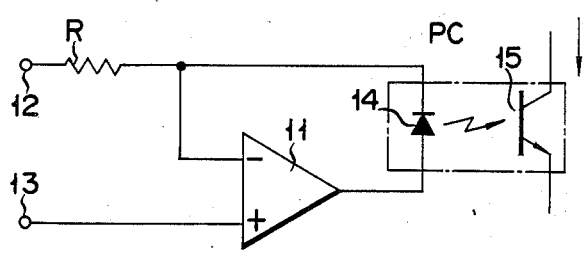

FIGS. 6A, 7A, 8A and 9A show the individual limiter circuits comprising a function generator. FIGS. 6B, 7B, 8B and 9B show the input/output characteristics of the above limiter circuits. In FIGS. 6A and 7A, the non inverting input terminal (+) of op amp 11 is connected to terminal 12, which applies a reference voltage Vref, such as a ground potential, and the inverting input terminal (−) is connected to terminal 13 thereby applying input voltage Vin via resistor R. A LED 14 has been inserted between output terminal and inverting input terminal (−) of op amp 11 as a photoelectric converting element. In the output circuit, the anode and cathode of LED 14 are respectively connected to the noninverting input terminal (−) and output terminal of op amp 11 is FIGS. 6A and 8A. While in FIGS. 7A and 9A, the anode and cathode connection is reversed. In FIGS. 8A and 9A, the terminal 13, which applies input voltage Vin, is connected to noninverting input terminal (+) of op amp 11 and terminal 12, which applies reference voltage Vref, is connected to noninverting input terminal (−) via resistor R. A photo transistor 15 is optically coupled to LED 14 as the photoelectric converting element. This LED 14 and photo transistor 15 comprise a photocoupler PC.

In the circuit shown in FIG. 6A, the output current Io (the collector current of photo transistor 15) flows only when the input voltage Vin is larger than the reference voltage Vref, as is shown in FIG. 6B. This relationship can be expressed as shown in the following equation (8). When Vin≦Vref $$I_0=0 \qquad (8)$$

When Vin>Vref $$I_0=K(Vin-Vref)/R$$

Where K is the conductivity transmission ratio of the photocoupler PC.

In the circuit shown in FIG. 7A, on the other hand, the output current Io flows only when the input voltage Vin is smaller than the reference voltage Vref, as is shown in FIG. 7B. This relationship can be expressed as shown in the following equation (9).
When Vin<Vref $$I_0=-K(Vin-Vref)/R \qquad (9)$$

When Vin≧Vref $$I_0=0$$

Figure 9B:
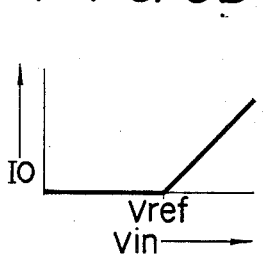

The circuit shown in FIG. 8A has the same characteristics as the circuit shown in FIG. 7A, as can be seen in the FIG. 8B, and the circuit shown in FIG. 9A has the same characteristics as the circuit shown in FIG. 6A, as can be seen in FIG. 9B.

FIG. 10 shows a function generator comprised of the limiter circuits shown in FIGS. 6A and 7A. The input terminal 21, which applies input voltage Vin, is connected to the inverting input terminal (−) of each op amp 11$_1$-11$_4$ via resistors R$_{11}$-R$_{14}$. Op amps 11$_1$ and 11$_2$ are constructed as shown in FIG. 7A and op amps 11$_3$ and 11$_4$ are constructed as shown in FIG. 6A. The reference voltages Vref$_1$-Vref$_4$, which are generated by reference generator circuit 22 formed of resistors R15-R18 serially connected between the positive and negative power sources, are applied to the noninverting input terminals (+) of op amps 11$_1$-11$_4$. The potential increases from Vref$_1$-Vref$_4$. Ground GND is connected to a node between resistors R$_{16}$ and R$_{17}$, which are connected to the noninverting input terminals (+) of op amps $11_2$, $11_3$. The noninverting input terminal (+) of op amp $11_1$ is connected to the node between resistors $R_{15}$ and $R_{16}$, and the noninverting input terminal (+) of op amp $11_4$ is connected between resistors $R_{17}$ and $R_{18}$.

The anode-cathode path of LED $14_1$ of photocoupler $PC_1$ is connected between the inverting input terminal (−) and the output terminal of op amp $11_1$, the anode-cathode path of LED $14_2$ of photocoupler PC is connected between that of op amp $11_2$, the cathode-anode path of LED $14_3$ of photocoupler $PC_3$ is connected between that of op amp $11_3$, and the cathode-anode path of LED $14_4$ of photocoupler $PC_4$ is connected between that of op amp $11_4$. The collector-emitter path of photo transistor $15_1$ of photocoupler $PC_1$ is connected between the negative power source and the output terminal 23, the collector-emitter path of photo transistor $15_2$ of photocoupler $PC_2$ between output terminal 23 and the positive power source, the collector-emitter path of photo transistor $15_3$ of photocoupler $PC_3$ between the output terminal 23 and the negative power source, and the collector-emitter path of photo transistor $15_4$ of photocoupler $PC_4$ between the output terminal 23 and the positive power source. Output terminal 23 is connected to ground GND via load resistor $R_1$.

The following is a description of the operation of a device having the above construction. When the input voltage Vin, which is applied to input terminal 21, is positive, op amps $11_3$, $11_4$ operate, and when the input voltage Vin is negative, op amps $11_2$, $11_1$ operate. At this time, if the transmission ratios of photocouplers $PC_1$–$PC_4$ are taken to be $K_1$–$K_4$, the output currents $I_{O1}$–$I_{O4}$ of photo transistors $15_1$–$15_4$ can be expressed as follows in equations (10-1)–(13-2).

When $Vin < Vref_1$ $$I_{O1} = K_1(Vref_1 - Vin)/R_{11} \qquad (10\text{-}1)$$

When $Vin \geq Vref_1$ $$I_{O1} = 0 \qquad (10\text{-}2)$$

When $Vin < Vref_2$ $$I_{O2} = K_2(Vref_2 - Vin)/R_{12} \qquad (11\text{-}1)$$

When $Vin \geq Vref_2$ $$I_{O2} = 0 \qquad (11\text{-}2)$$

When $Vin < Vref_3$ $$I_{O3} = 0 \qquad (12\text{-}1)$$

When $Vin \geq Vref_3$ $$I_{O3} = K_3(Vin - Vref_3)/R_{13} \qquad (12\text{-}2)$$

When $Vin < Vref_4$ $$I_{O4} = 0 \qquad (13\text{-}1)$$

When $Vin \geq Vref_4$ $$I_{O4} = K_4(Vin - Vref_4)/R_{14} \qquad (13\text{-}2)$$

The output current $I_0$ obtained from output terminal 23 is the sum of output currents $I_{O1}$–$I_{O4}$ of photo transistors $Q_1$–$Q_4$ so $$I_0 = -I_{O1} + I_{O2} - I_{O3} + I_{O4} \qquad (14)$$

With the construction of FIG. 10, in order to confirm the operation, a test was conducted with the resistors $R_{11}$, $R_{14}$ set at 2.5 kΩ, the resistors $R_{12}$, $R_{13}$ set at 5 kΩ, the reference voltage $Vref_1$ at −5 V, $Vref_2$, $Vref_3$ to 0 V and $Vref_4$ to 5 V. Toshiba's TA75902P were used as the op amps $11_1$–$11_4$, and TLP621 (with a current transmission ratio of nearly 1) were used as the photocouplers $PC_1$–$PC_4$.

Figure 11A:
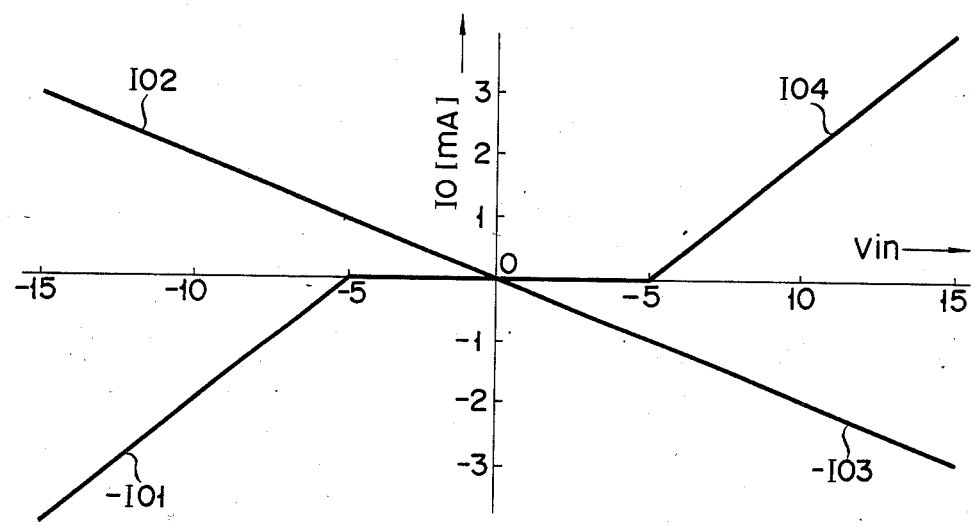
FIGS. 11A, 11B show the characteristics of the input voltage-output current of the test circuit, confirming the operation of the circuit shown in FIG. 10.
Figure 11B:
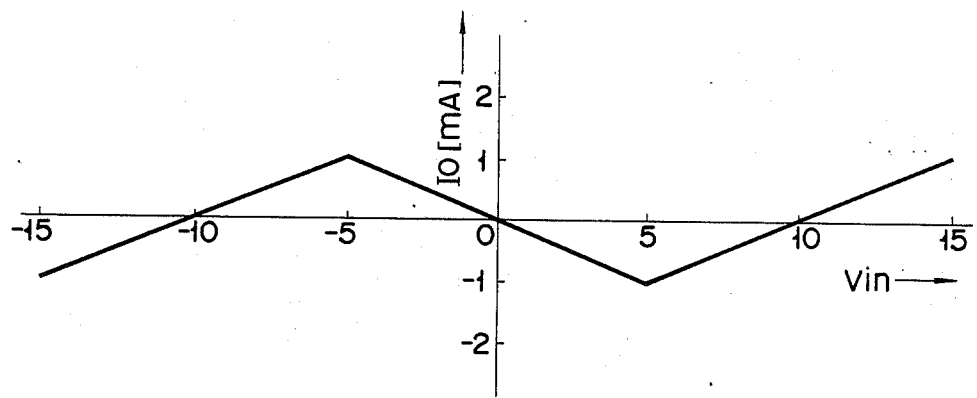

FIG. 11A shows output currents $I_{O1}$–$I_{O4}$ (theoretical values) of photo transistors $15_1$–$15_4$ of the function generator shown in FIG. 10. In this case, the outgoing current from output terminal 23 towards the load is taken to be in the positive direction and the ingoing current is taken to be negative. FIG. 11B shows the waveform of output current $I_0$, which is composed of the currents $I_{O1}$–$I_{O4}$ shown in FIG. 11A. As can be seen, the triangular wave sequentially increases and decreases. By suitably setting the levels of reference voltages $Vref_1$–$Vref_4$ the point of variation of the waveform can be set at a predetermined point, and by suitably setting the resistance values of resistors $R_1$–$R_4$, the wave slope of the output waveform can be set at a determined value. Accordingly, it is possible to obtain any function using these two characteristics.

With this kind of construction, it is possible to electrically isolate the input circuitry and the output circuitry with photocouplers $PC_1$–$PC_4$ so these circuits can be operated with different voltages, resulting in simplification of circuit design.

Figure 12:
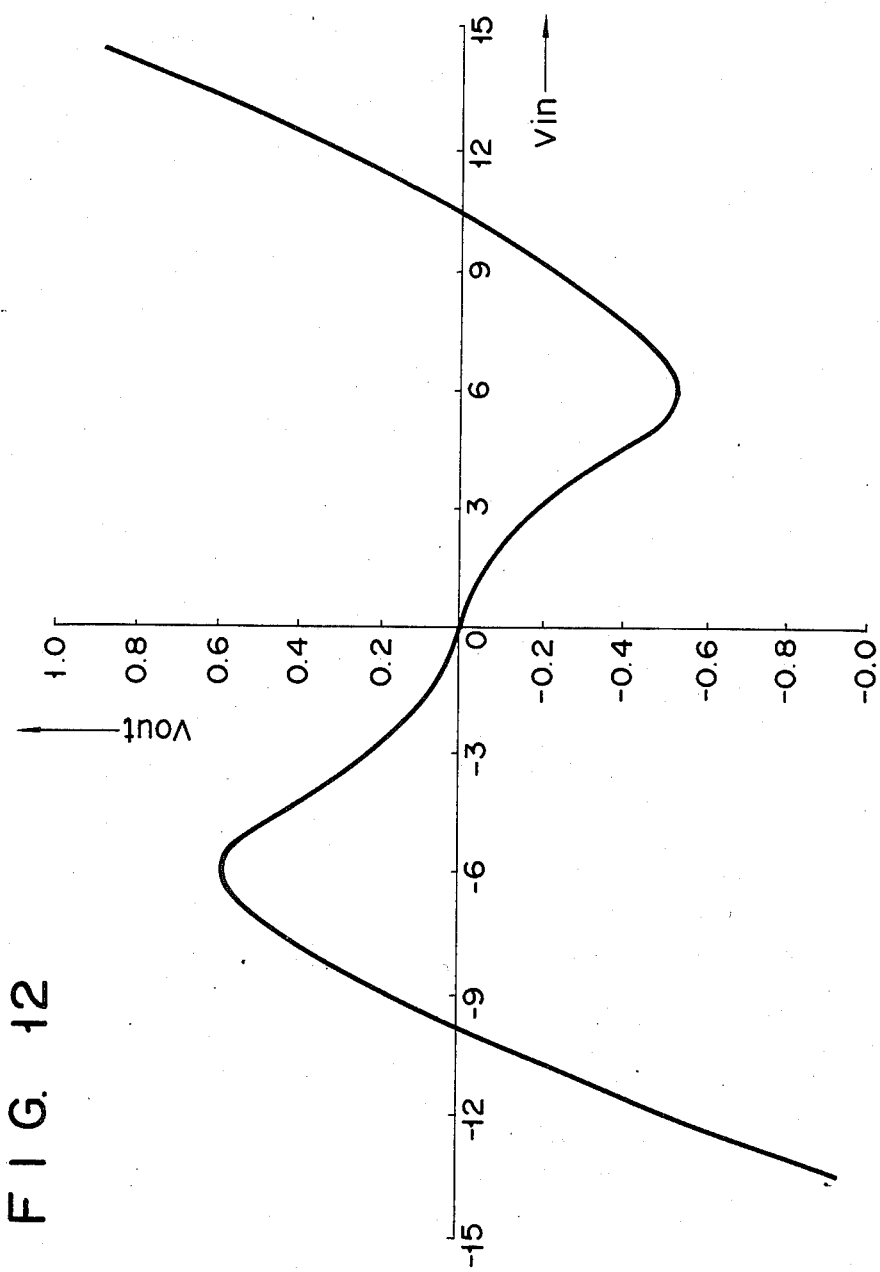
FIG. 12 shows the characteristics of the input voltage-output voltage of the test circuit built for confirming the operation of the circuit shown in FIG. 10.

FIG. 12 shows the relationship between the input voltage Vin and the output voltage Vout obtained in the above test. As can be seen, a waveform that is nearly the same as the theoretical value shown in FIG. 11b can be obtained. In order to convert the output current $I_0$ to voltage Vout, the a 1 kΩ load resistor RL was provided.

Figure 13:
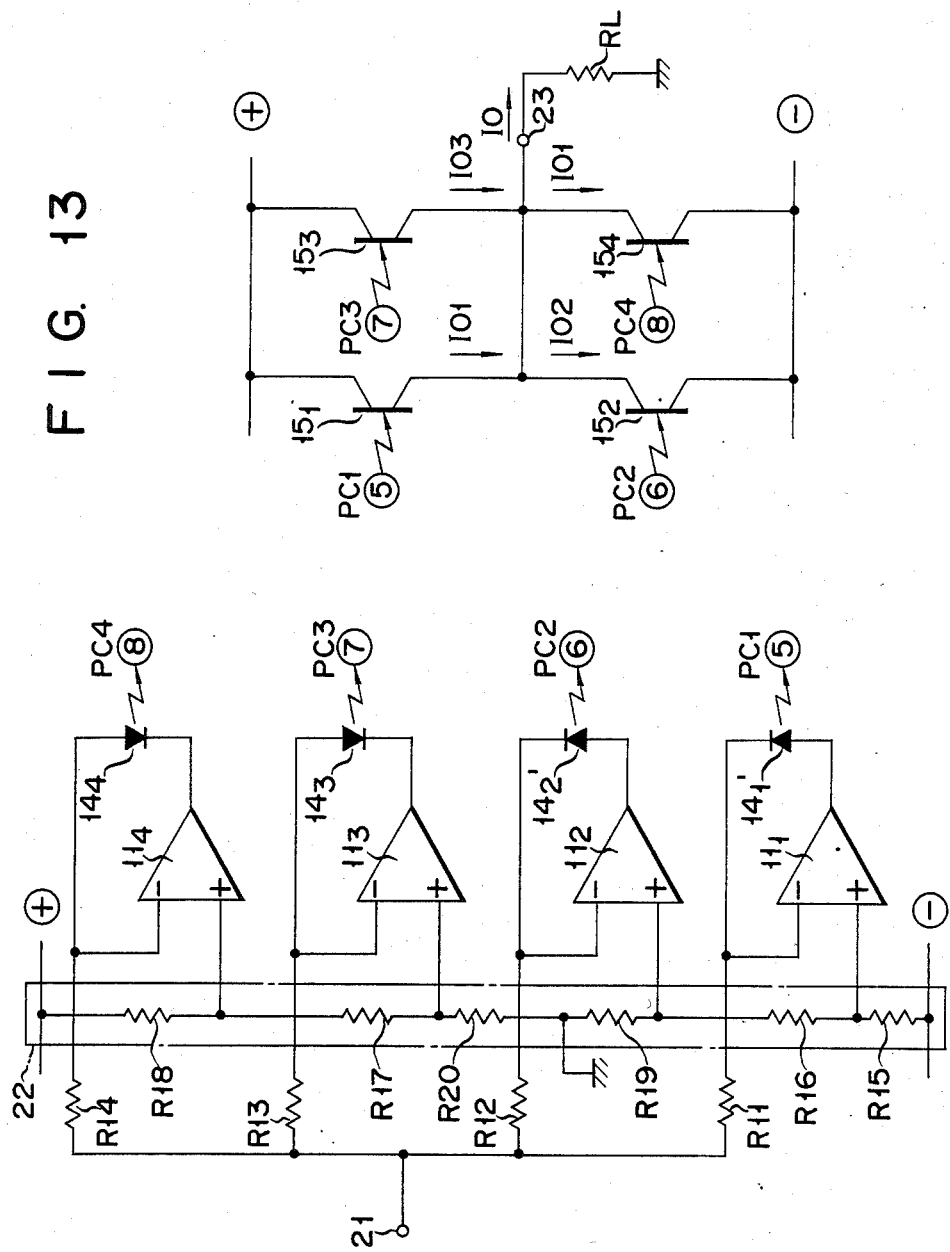
FIG. 13 shows a function generator of another embodiment of the invention.
Figure 14:
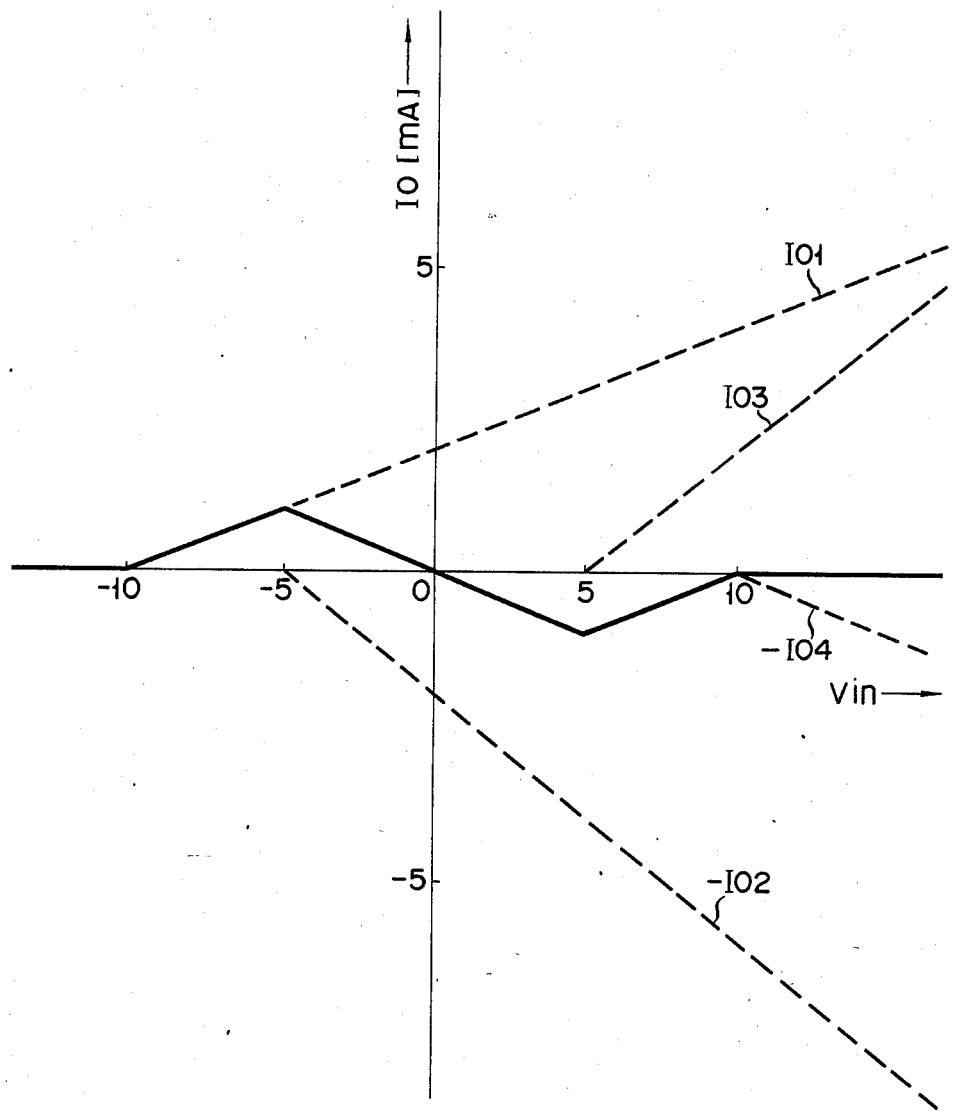
FIG. 14 shows the characteristics of the input voltage-output current of the test circuit built for confirming the operation of the circuit shown in FIG. 13.

FIG. 13 shows a function generator of another embodiment of this invention. In contrast to the function generator of FIG. 10, by setting the reference voltages $Vref_1$–$Vref_4$ and changing the connections of the photo transistors $15_1$–$15_4$, which act as the output transistors, a construction that provides different functions can be provided. The function obtained by the generator of FIG. 13 is shown in FIG. 14. This generator comprises four limiter circuits, which are shown in FIGS. 6A and 7A. In FIG. 13, the same reference numerals have been used for the same parts in FIG. 10 and a description of which has been omitted. In the circuit shown in FIG. 13, the cathode-anode path of LED $14_1$ is connected between the output terminal and inverting input terminal (−) of op amp $11_1$ and the cathode-anode path of LED $14_2$ is connected between the output terminal and inverting input terminal (−) of op amp $11_2$. In reference voltage generator circuit 22, resistor $R_{19}$ is inserted between ground and the node of noninverting input terminal (+) of op amp $11_2$ and resistor $R_{16}$, and resistor $R_{20}$ is inserted between ground and the node of the noninverting input terminal (+) of op amp $11_3$ and resistor $R_{17}$. The collector-emitter path of photo transistor $15_1$ of the photocoupler $PC_5$ is connected between the positive power source and the output terminal 23, and the collector-emitter path of photo transistor $15_2$ of photocoupler $PC_6$ is connected between the negative power source and the output terminal 23. Furthermore, the collector-emitter path of photo transistor $15_3$ of photocoupler $PC_7$ is connected between the output terminal 23 and the positive power source, and the collector-emitter path of photo transistor $15_4$ of photocoupler $PC_8$ is connected between the output terminal 23 and the negative power source.

With this kind of structure, as well, the operation is basically the same as with the FIG. 10 embodiment and the same effect can be obtained.

Figure 15:
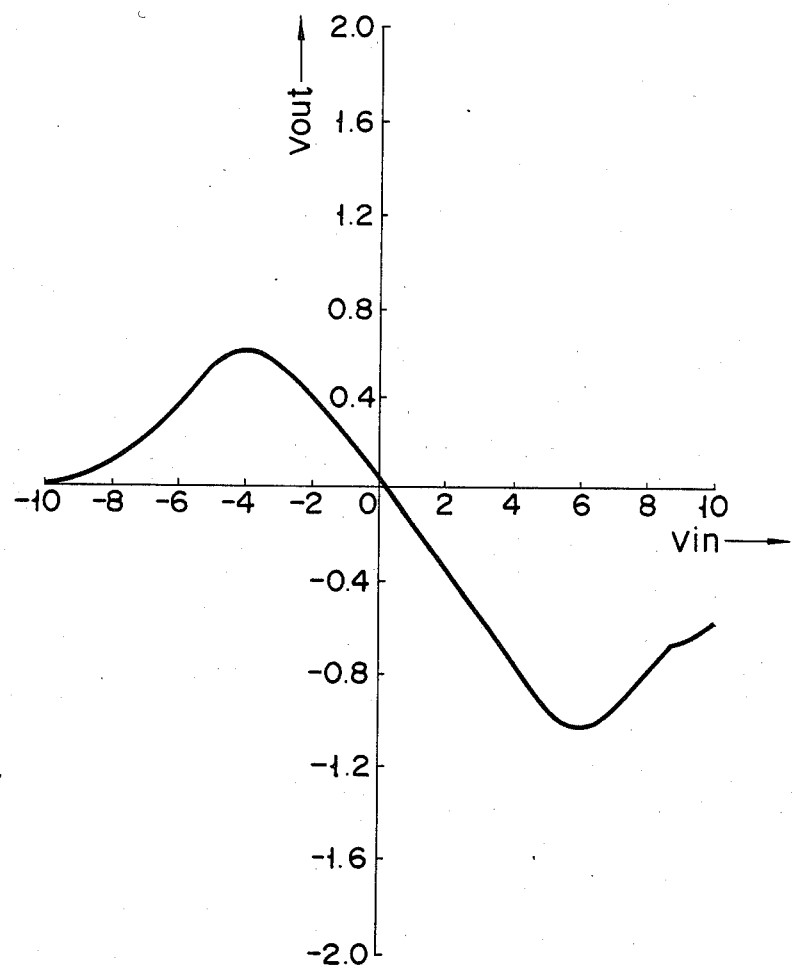
FIG. 15 shows the characteristics of the input-output voltage of the test circuit built for confirming the operation of the circuit shown in FIG. 13.

In order to confirm the operation of this circuit, resistors $R_{11}$, $R_{14}$ were set to 5 k$\Omega$, $R_{12}$, $R_{13}$ to 2.5 k$\Omega$, and $R_{15}$–$R_{20}$ were given equivalent resistances. A positive power source VCC of 15 V and a negative power source VEE of $-15$ V were applied, and the reference voltage $Vref_1$ was set to $-10$ V, $Vref_2$ to $-5$ V, $Vref_3$ to 5 V, and Vref to 10 V. The op amps $11_1$–$11_4$ and the photocouplers $PC_5$–$PC_8$ were the same as those used in the test of the circuit of FIG. 10. The result of the test was a waveform of output voltage Vout in relation to variations in the input voltage Vin such as that shown in FIG. 15. Here, when the input voltage is under $-10$ V, it is possible set the output current $I_0=0$ (output voltage Vout=0 V), while when Vin is over 10 V, $I_0$ does not equal 0. The reason for this is that when the input voltage Vin is in the range of $-10$ V$<$Vin$<10$ V, the photo transistors $15_1$–$15_4$ are conductive in the forward direction. When the input voltage Vin is over 10 V, the tolerances of all the op amps $11_1$–$11_4$ are added and output. As shown in FIG. 15, however, when the input voltage Vin is in the range of $-5$ V$<$Vin$<5$ V, the circuit has a negative resistance.

In the embodiments of FIG. 10 and FIG. 13, only the cases where they comprised a combination of the limiter circuits shown in FIGS. 6A and 7A, were described. This combination, however, may be suitably selected from the circuits of FIG. 6A to FIG. 9A in response to an output function to be produced.

What is claimed is:

1. A function generator having a circuit input terminal and a circuit output terminal comprising:
    a plurality of operational amplifiers, each having a first input terminal, a second input terminal, and an output terminal;
    a reference voltage generating circuit for applying different reference voltages to said first input terminals of said plurality of amplifiers, individually;
    a resistor connected between said second input terminal of each of said plurality of operational amplifiers and said circuit input terminal to which an input voltage is applied;
    an electrophoto-converting element connected between said output terminal and said second input terminal of each of said plurality of amplifiers;
    an output circut having a plurality of photoelectric-converting elements, optically coupled with said electrophoto-converting elements, which operate when the corresponding electrophoto-converting elements operate to form a current path between a power source for said output circuit and said circuit output terminal; and
    a load element for converting the output current of said plurality pf photoelectric-converting elements into voltage.

2. A function generator according to claim 1, wherein said electrophoto-converting element has an anode and a cathode, said first input terminal is the noninverting input terminal of said amplifier, and said second input terminal is the inverting input terminal of said amplifier.

3. A function generator according to claim 2, wherein said inverting input terminal of said amplifier is connected to said circuit input terminal to which an input voltage is applied, said noninverting input terminal is connected to said different reference voltage for said amplifier, said anode of said electrophoto-converting element is connected to said inverting input terminal of said amplifier and said cathode is connected to said output terminal of said amplifier.

4. A function generator according to claim 2, wherein said inverting input terminal of said amplifier is connected to said circuit input terminal to which an input voltageg is applied, said noninverting input terminal is connected to said different reference voltage for said amplifier, said cathode of said electrophoto-converting element is connected to said inverting input terminal of said amplifier and said anode is connected to said output terminal of said amplifier.

5. A function generator according to claim 2, wherein said noninverting input terminal of said amplifier is connected to said circuit input terminal to which an input voltage is applied, said inverting input terminal is connected to said different reference voltage for said amplifier, said anode of said electrophoto-converting element is connected to said inverting input terminal of said amplifier and said cathode is connected to said output terminal of said amplifier.

6. A function generator according to claim 2, wherein said noninverting input terminal of said amplifier is connected to said circuit input terminal to which an input voltage is applied, said inverting input terminal is connected to said different reference voltage for said amplifier, said cathode of said electrophoto-converting element is connected to said inverting input terminal of said amplifier and said anode is connected to said output terminal of said amplifier.

* * * * *